# 2,701,816
// Patented Feb. 8, 1955

2,701,816

FORMYLATED TERPENE PRODUCTS

Karl Büchner, Duisburg-Hamborn, and August Hagemann, Duisburg-Meiderich, Germany, assignors to Ruhrchemie Aktiengesellschaft, Oberhausen-Holten, Germany, a German corporation No Drawing. Application March 11, 1950,
Serial No. 149,212

Claims priority, application Germany March 17, 1949

3 Claims. (Cl. 260—598)

The invention relates to improvements in formylating terpene products.

It is known to add water gas, with the use of appropriate catalysts and at raised pressure, to olefinic double compounds to form aldehydes, or ketones and alcohols. This formylation (Formylierung) has previously been proposed for terpene hydrocarbons. Terpene fractions obtainable from natural substances contain not only individual terpene hydrocarbons, but also a whole succession of terpenes, of which the lowest boiling components have a turpentine- or camphor-like odour, whilst the terpenes of the main fraction exhibit the characteristic odour of the starting material. Natural terpene fractions, in particular those from orange and/or lemon peel, contain, together with unsaturated hydrocarbons, also aldehydes, alcohols, esters and other similar compounds containing oxygen.

In further processing, the peroxides are a particular source of trouble within the raw material containing terpenes. These peroxides form very easily during the addition, and lead during the addition of water gas, to undesired, evil-smelling products. Further, the components of oxygen content affect the raw terpenes which may combine with the reaction products of the formylation to form acetals, alcohols and other condensation products. These high molecular residues occasion appreciable losses.

It has been found that terpene fractions obtained from natural substances can be subjected without difficulty to the catalytic addition of water gas, if they are previously treated with substances having a reducing action. For the removal of peroxides reducing substances are suitable, the use of which does not change the terpenes. Substances of this kind are lower sulfates of metals which may be present in several degrees of valence, such as ferrous sulfate, vanadyl sulfate, manganous sulfate in the presence of alkali, moreover nitrites, such as sodium nitrite or potassium nitrite, chlorides, such as stannous chloride (SnCl2). Small amounts of finely distributed reduced metals, such as cobalt and nickel, are also suitable for this purpose. Ferrous sulfate, however, is preferably employed, no secondary reactions being occasioned by this substance. For a satisfactory removal of the peroxides a repeated washing with ferrosulphate solution is sufficient. It is expedient, following upon this washing, to remove the quantities of acid remaining in the terpenes by washing, in the absence of oxygen, with bicarbonate or soda solutions, and finally with water.

Of course, for taking out iron or other reducing agents employed for removal of the peroxides also other alkaline substances may be used which occasion no resinification or transposition of the terpenes. Substances of this kind are oxides, hydroxides, carbonates or basic carbonates of the metals of the second group of the periodic system, especially of alkaline earths and zinc. Bicarbonates of alkalis and ammonia are also suitable for this purpose, caustic alkalis are less advisable due to their highly emulsifying effect.

With the process according to the invention natural terpenes from orange and lemon peel or turpentine, boiling in the range of 150 to 180° C. may be formylated. Both diolefinic monocyclic and dicyclic terpenes containing one double bond may be put into the formylation. Using the firstly mentioned terpenes terpene aldehydes are obtained, that is oxygen containing derivatives of the summary formula $C_{11}H_{18}O$ containing still one double bond, whilst terpene aldehydes of the same summary formula but containing no double bond result by using dicyclic terpenes. In Example I a diolefinic terpene obtained from lemon peel is mentioned boiling between 175 and 176° C. But also terpene fractions obtained from turpentine-oil or turpentine-oil first runnings and boiling in the range of 153.8 to 154.9° C. or 160 to 162° C. may be processed according to the invention.

For the formylation of terpenes all catalysts may be employed being known up to date and being suitable for the addition of water gas to unsaturated hydrocarbons. Solutions of cobalt or iron carbonyls, for instance, may also be used. Addition of water gas is preferably carried out with a gas, the ratio of carbon monoxide to hydrogen of which is 1:1. It also is possible, however, to carry out formylation reactions if the ratio of carbon monoxide to hydrogen is between 1:3 and 3:1. As to the inert constituents of the gas is to say: The formylation reaction is considerably moderated at a CO partial pressure below 50 kg./sq. cm. It is advisable, therefore, at a content of inert constituents in the water gas above 5%, to remove the rest gas from the recycle during the formylation reaction.

In the formylation of terpenes higher yields are obtained if the water gas addition is carried out not with the total terpene mixture but only with close cut fractions. It is therefore expedient to submit the terpene mixture, freed from its peroxide content according to the invention, to a close fractionation in an efficiently separating column of, for example, 20 theoretical plates. It is advantageous to work with a careful exclusion of the oxygen in the air. To this end water gas may be used as a protecting gas, which, for the removal of the last traces of oxygen, has been passed for example at 160° C. over a reducing catalyst, for example a cobalt catalyst or a nickel catalyst. In this way terpene fractions which boil within one degree can be isolated.

The inert atmosphere employed in the aforementioned steps may consist of an inert gas. This inert gas may first be passed over a reducing catalyst to substantially free the gas from traces of oxygen. An example of a reducing catalyst to be used in such a case is a cobalt catalyst.

It is further advantageous, in order to secure a high yield of formylation products, to dilute the terpene fractions to be processed by means of solvents which do not participate in the reaction. As a diluting agent preferably saturated aliphatic hydrocarbons boiling in the range of 60 to 130° C. are suitable. Low boiling aromatics or ethers, too, may be employed as diluting agent. The terpene concentration most favourable for the formylation is between 25 and 80% by volume, preferably 50% by volume of terpenes. The water gas addition at 132° C. to 138° C. then passes through in sixty minutes at least 70% of the theoretical.

At the conclusion of the water gas addition, the aldehydes obtained contain small amounts of dissolved metals present in the form of metal organic compounds of cobalt and iron. These metal residues were previously removed from the formylation products by means of dilute inorganic acids, preferably 5%–10% sulphuric acid. However, in the presence of strong acids the terpenes very easily regroup themselves within the molecule. This reaction occurs when the terpene aldehydes obtained as end products are treated with strong acids to remove their metal content. Without affecting the terpene molecule, the metal content present may easily be removed by means of acids, having a slight hydrogen ion concentration. Citric acid has shown itself to be particularly well suited for this purpose. High concentrations of inorganic acids, the 5 to 10% solutions of which show a pH value far below 1, must also be prevented if buffer agents are used, otherwise the terpenes regroup within the molecule. Merely with acids, the 5 to 10% solutions of which show a pH value not considerably below 2, the terpene skeleton remains unaffected. Phosphoric acid, acetic acid, oxalic acid, citric acid, succinic acid are suited. Of course the pH value of solutions of strong inorganic acids, too, may be in the range of 2, but in this case solutions contain, for instance with sulphuric acid, only amounts corresponding to a n/100 dilution, that is approx. 0.05%. Since acids of a concentration of 2–10% must be employed for the removal of metals being dissolved in the formylation products, an inorganic acid of $n/100$ concentration would not be sufficient. With slightly dissociated acids, as for instance with the above mentioned organic acids, more valuable products are obtained in the purification of the aldehydes obtained than with sulphuric acid as previously used.

After the removal of the traces of metal, the previously added solvent is removed from the formylation product by warming in a water or oil bath while passing-in protecting gases; small amounts of a stabilizer are added to the aldehydes to prevent resinification.

Example I

Of an orange terpene fraction having the following distinctive numbers:

| | |
|---|---|
| Density | $D_{20}=0.846$ |
| Refractive index | $n_D^{20}=1.4738$ |
| Iodine number | JZ=362 |
| Neutralization number | NZ=0 |
| Saponification number | VZ=2 |
| Hydroxyl number | OHZ=0 |
| Carbonyl number | COZ=12 |
| Molecular weight | =141 |

2 kg., added in parts, were agitated every fifteen minutes with 1000 ccm. of a solution of 500 grams $FeSO_4.7H_2O$ per litre of water. The ferrosulphate solution turned a brown colour. This treatment was continued until the colour of the ferrosulphate solution remained unchanged. The air above the terpene fraction was during the whole time replaced by inert gases. At the conclusion of the ferrosulphate washing the terpenes were treated once with a 5% soda solution and then four times with water, using 2000 ccm. of water each time, again in the absence of oxygen in the air. To remove the last traces of water, the terpenes were then filtered through dry filters and split, in a completely automatic column, into close cut fractions.

There was obtained:

| | |
|---|---|
| Between 170° C. and 175° C. | 5 vol. percent (preliminary run). |
| Between 175° C. and 176° C. | 29.5 vol. percent. |
| Between 176° C. and 177° C. | 41.0 vol. percent. |
| Between 177° C. and 178° C. | 12.1 vol. percent. |
| Between 178° C. and 185° C. | 7.0 vol. percent. |

In respect of their odour these fractions differ strongly from one another. The preliminary runs have a slightly sour turpentine-like odour. The first two fractions smell of lemon, the third like caraway or thyme, whilst the components boiling above 178° C. have a sharp, unpleasant odour.

500 ccm. of the fraction boiling between 175° C. and 176° C. were diluted with 500 cc. of hexane, and after the addition of 50 cc. of cobalt-thorium-magnesium-kieselguhr-catalyst were subjected to formylation at 138° C. at a mean water gas pressure of 150 kg. per sq. cm.

After cooling, the autoclave was emptied and the reaction product was extracted in a nitrogen atmosphere from the undissolved catalyst. The aldehyde mixture was then stirred with a 10% aqueous solution of citric acid, the oxygen in the air again being carefully excluded. After several hours the reaction product which had become lighter in colour was separated from the aqueous phase, which had now turned pink, and washed twice with water. In the boiling water bath, the added hexane was removed, a stream of nitrogen being passed through. The product was 500 cc. of a terpene aldehyde having the following characteristics:

| | |
|---|---|
| Density | $D_{20}=0.920$ |
| Refractive index | $n_D^{20}=1.4746$ |
| Iodine number | JZ=124 |
| Neutralization number | NZ=1.3 |
| Saponification number | VJ=16.6 |
| Hydroxyl number | OHZ=22 |
| Carbonyl number | COZ=237 |
| Molecular weight | =175 |

The above figures show that the end product is a 75% terpene aldehyde.

Example II

A Portuguese balsam turpentine-oil was freed from its content of peroxides by shaking out with a 10% $NaNO_2$ solution at room temperature. From the material thus purified a fraction boiling between 154° C. and 155° C. was split off using water gas as a protecting gas at a vacuum of 50 mm. mercury. This fraction had the following distinctive numbers:

| | |
|---|---|
| Density | $D_{20}=0.861$ |
| Iodine number | JZ=353 |
| Molecular weight | =136 |
| Refractive index | $n_D^{20}=1.4654$ |

500 ccm. of this fraction were diluted with 500 ccm. of hexane and then diluted with 50 ccm. of a reduced cobalt-thorium-magnesium-kieselguhr-catalyt. The mixture was given into an autoclave of 2300 ccm. volume and treated with water gas at 140° C. and a pressure of 150 kg./sq. cm. which was maintained by continually filling up the autoclave with hydrogen. After a reaction time of 1 hour at a free gas room of 1200 ccm. altogether 200 kg./sq. cm. water gas were reacted. Then pressure was released and the product obtained separated by filtering from the catalyst, the oxygen in the air being excluded. Finally, the product was washed with a 5% acetic acid and the previously added hexane was removed by heating on a water bath, the oxygen in the air again being excluded.

The product was 450 ccm. of an aldehyde smelling of pine needles and having the following characteristics:

| | |
|---|---|
| Iodine number | JZ=160 |
| Neutralization number | NZ=1 |
| Ester number | EZ=4 |
| Hydroxyl number | OHZ=3 |
| Carbonyl number | COZ=276 |

We claim:

1. Method for the preparation of terpene formylation products by the catalytic addition of water gas to terpene hydrocarbons, which comprises treating a terpene fraction obtained from natural substances with a salt solution having a reducing action to remove the peroxides therefrom, washing the treated terpene fraction with an aqueous solution of alkali carbonates in an inert atmosphere, fractionating the washed terpene in an inert atmosphere to substantially remove any oxygen-containing hydrocarbon substances, subjecting the washed fractionated terpene to catalytic water-gas addition, treating the reaction products of the catalytic water-gas addition with an acid having a pH of more than 2 selected from the group consisting of citric acid and acetic acid to remove any metal present, and recovering terpene formylation products.

2. Method for the preparation of terpene formylation products by the catalytic addition of water gas to terpene hydrocarbons, which comprises treating a terpene fraction obtained from natural substances with a salt solution having a reducing action to remove the peroxides therefrom, washing the treated terpene fraction with an aqueous solution of alkali carbonates in an inert atmosphere, fractionating the washed terpene in an inert atmosphere to substantially remove any oxygen-containing hydrocarbon substances, subjecting the washed fractionated terpene to catalytic water-gas addition, treating the reaction products of the catalytic water-gas addition with citric acid having a pH of more than 2 to remove any metal present, and recovering terpene formylation products.

3. Method for the preparation of terpene formylation products by the catalytic addition of water gas to terpene hydrocarbons, which comprises treating a terpene fraction obtained from natural substances with a salt solution having a reducing action to remove the peroxides therefrom, washing the treated terpene fraction with an aqueous solution of alkali carbonates in an inert atmosphere, fractionating the washed terpene in an inert atmosphere to substantially remove any oxygen-containing hydrocarbon substances, subjecting the washed fractionated terpene to catalytic water-gas addition, treating the reaction products of the catalytic water-gas addition with acetic acid having a pH of more than 2 to remove any metal present, and recovering terpene formylation products.

(References on following page)

References Cited in the file of this patent

UNITED STATES PATENTS

| | | |
|---|---|---|
| 2,339,429 | Rummelsburg | Jan. 18, 1944 |
| 2,415,102 | Landgraf et al. | Feb. 4, 1947 |
| 2,437,600 | Gresham et al. | Mar. 9, 1948 |
| 2,462,448 | Whitman | Feb. 22, 1949 |
| 2,497,303 | Gresham et al. | Feb. 14, 1950 |
| 2,501,200 | Wearn | Mar. 21, 1950 |
| 2,560,360 | Mertzweiler et al. | July 10, 1951 |
| 2,584,539 | Bordenca et al. | Feb. 5, 1952 |
| 2,604,491 | Hale | July 22, 1952 |
| 2,638,487 | Russum et al. | May 12, 1953 |

OTHER REFERENCES

FIAT Final Report 1000 (PB-81383), available to public December 26, 1947, page 21.